Patented June 11, 1940

2,204,197

UNITED STATES PATENT OFFICE 2,204,197

INSECTICIDE

Homer E. Whitmire, Richmond Heights, Mo., assignor to Shell Oil Company, Incorporated, a corporation of Virginia No Drawing. Application February 11, 1938, Serial No. 190,044

17 Claims. (Cl. 167—22)

This invention relates generally to insecticides.

In insecticidal concentrates, such as are employed in the manufacture of sprays, a group of cyanates have been used to some extent. Among the more common members of this group are the thiocyanate of mono-ethyl ether of diethylene glycol, thiocyanate of mono-butyl ether of diethylene glycol, the thiocyanate of sec-octyl acetate or beta-ethox-ethyl beta-thiocyanate propionate; alkyl-thiocyanates, iso-thiocyanates, selenocyanates, iso-selenocyanates, telluro-cyanates and iso-tellurocyanates. These compounds may be classed generally as alkyl rhodanates and equivalent compounds in which the sulphur is replaced by other elements, such as selenium and tellurium. Herein this group of substances, and its equivalents, will be descriptively termed organic cyanates.

The object of the present invention, generally stated, is to provide an insecticide having increased repellent power and quick paralytic action upon contact with insects.

A further object is to provide an insecticide of high potential derived from organic cyanates.

Another object of the invention is to provide an insecticide wherein the repellent power of such repellent substances as naphthalene is prolonged.

A more specific object of the invention is to provide an insecticidal principle in such form that the vapors thereof have an insect repellent property and which, upon contact with insects, produces a sickness and paralysis.

Other objects of the invention will become apparent when the following description is read.

In accordance with the present invention an insecticidal principle of high potential and having advantageous contact properties may be produced by reacting a chlorinated ether with an organic cyanate or with a cyclohexylamine. The organic cyanate reaction product is an insecticidal principle having a contact vapor toxicity producing death to insects and also having a desirable repellent power. The reaction product of cyclohexylamine with chlorinated ether is an insecticidal principle which, unlike unreacted cyclohexylamine, produces a complete paralysis of insects stopping all body movements shortly after the insects are knocked down with a vapor or spray. Moreover, a particularly desirable characteristic of the cyclohexylamine-chlorinated ether reaction product is the stabilizing effect which this product has upon such known insecticidal principles as pyrethrum, derris and rotenone, which largely inhibits the breaking down of such insecticidal principles by oxidation. It will be understood of course, that insecticides constituted according to the present invention may comprise one or both of the types of reaction products, namely, those of chlorinated ether with an organic cyanate and those of chlorinated ether with a cyclohexylamine.

In accordance with one embodiment of the invention, an organic cyanate and a chlorinated aliphatic ether, such as dichlorethyl ether (or dichloro-diethyl ether) are endothermically reacted. Upon mixing dichlorethyl ether with an organic cyanate and applying heat, a change of color is observed. Upon application of a small amount of heat a reaction takes place, which is accompanied by a drop in temperature, unless extrinsic heat is added. If the reaction is carried out at a higher temperature such, for example, one in excess of 100° C., a distinct change of color occurs. Such reacted mixture, upon standing for a few days at room temperature, produces a slight amount of a very distinct sediment of extremely fine subdivision. The finished product has a distinctly different type of odor from either the dichlorethyl ether or the organic cyanate or the mixture of the same. Such a product resulting from an endothermic reaction of dichlorethyl ether and organic cyanate is a powerful insect repellent and a substance of high toxicity to insects in that, upon contact with it, even when greatly diluted, insects are subject to "crying," vomiting and leg paralysis.

By endothermic reaction of dichlorethyl ether and organic cyanate, as that expression is used in this description and the appended claims, is to be understood a reaction in the course of which extrinsic heat is added to the reacting materials. In accordance with one embodiment sufficient extrinsic heat is added to elevate the temperature to at least 100° C., but it is to be understood that a reaction product having effective insecticidal properties results from the carrying out of the reaction at lower temperatures so long as the reaction is accompanied by the addition of heat.

In accordance with the present invention a chlorinated ether and an organic cyanate may be reacted in the proportions of about 1 to 3 parts by volume of chlorinated ether to each part of an organic cyanate, these proportions being suggested as economical and suitable for the production of an insecticidal principle having high repellent power as well as high toxic effect upon insects. For example, a mixture of 20 parts dichlorethyl ether to 15 parts of organic cyanate (which may be any one of the series of cyanates mentioned in the introductory part of this specification, or a mixture of them) may be heated to a temperature of about 115° C. at which temperature, and upon being held at this temperature, with concomitant stirring, for a period of from five to ten minutes, a chemical reaction takes place. Higher temperatures may be employed, but above 125° C. care must be exercised to prevent charring.

The reacted mixture upon being stored at normal room temperature for a few days develops a slight amount of a brown precipitate which may be removed by filtration. Such an insecticidal concentrate may be applied in a variety of ways.

As a specific embodiment of the present invention and in order to provide an insecticidal concentrate having quick paralytic properties, the ether-cyanate-reaction product may be incorporated with an essential oil and, if desired, a common insecticidal vehicle, such as a mineral oil distillate. For example, 20 parts by volume of dichlorethyl ether may be mixed with 15 parts of an organic cyanate and the mixture slowly heated, for example, to 125° C. After five or ten minutes at this temperature about 15 parts of an essential oil, such as beta-terpineol, may be added and thoroughly incorporated. Upon maintaining the temperature of 110° to 115° C. for a period of about ten minutes with concomitant stirring, some further chemical reaction may take place. Then the requisite amount of any suitable vehicle, such as a mineral oil, for example 50 parts by volume, may be added.

The incorporation of an essential oil which may be any one of a variety, as for instance terpineol, sesquiterpenes, d-pinene, d-camphene, sylvestrene, cedar wood or leaf oil, cypress wood or leaf oil, camphor oil, and the like, or mixtures of these, improves the contact properties of vapors carrying the insecticidal principle resulting from the reaction of dichlorethyl ether and the organic cyanate. Moreover, the presence of such an essential oil which is itself odoriferous relieves the harshness (to humans) of the aroma of the ether-cyanate-reaction product, and hence adapts the concentrate to use in the presence of humans and other animals without disagreeable effect.

As illustrating the effect of the concentrate prepared in accordance with the embodiment just described, 1 part of the concentrate was diluted with 19 parts of kerosene and the resultant insecticide tested according to the standard Peet-Grady test method. When 12 cc. of the 5% solution of the above described concentrate was employed on flies in a Peet-Grady death chamber the knock-down in three minutes was 80%, at five minutes 92%, at ten minutes 97%. Such an insecticidal concentrate is, therefore, highly efficient even when greatly diluted with the usual spray bases such as kerosene. Such a fly spray is substantially colorless and is possessed of no disagreeable odor and produces no nose or throat irritation to humans and animals.

As a further embodiment of the present invention, the ether-cyanate-reaction product may be incorporated with other ingredients so as to produce a highly effective insect repellent concentrate which is also possessed of high toxicity. While it is to be understood that the insecticidal principle of the present invention may be employed with any known insecticidal principles, such as rotenone and derris derivatives, one example of a highly effective complex concentrate is illustrated by the following formula:

| | | Range | Specific |
|---|---|---|---|
| Ether-cyanate-reaction product | gallons | 20-30 | 30 |
| Hydrogenated naphthalene | do | 5-10 | 5 |
| Naphthalene crystals | pounds | 25-100 | 25 |
| Essential oils | gallons | 10-12 | 10 |
| Odoriferous oil e. g., citronella | do | As desired | 2 |
| Mineral oil—diluent | do | As desired | 50 |

In accordance with this example, 2 parts by volume of dichlorethyl ether are mixed with 1 part by volume of an organic cyanate and heated at a temperature of 115° C. When the reaction is progressing well the naphthalenic bodies (hydrogenated naphthalene and naphthalene crystals) are added and the temperature brought back to 115° C. While the temperature is thus maintained the essential oils, which may be any of those hereinbefore mentioned in connection with the previous embodiment, may be incorporated and the mixture permitted to cool. After thorough incorporation, the mineral oil and the odoriferous oil, such as citronella, may be added. Upon cooling the mixture may be filtered to remove the fine precipitate resulting from the reaction as hereinbefore described.

An insecticide made in accordance with this embodiment possesses highly efficient insect repellent properties by virtue of the fact that highly toxic vapors are given off over an extended period of time from a surface to which it has been applied. The desirable vaporization characteristics are accomplished by the incorporation of the essential oils and the naphthalene bodies, while the characteristic rapid vaporization of naphthalene is substantially deterred, and hence the effective life of the repellent prolonged by the incorporation of hydrogenated naphthalene. The product, according to this embodiment, has a marked "tear gas" effect upon insects causing insects to cry and vomit even when they are exposed to relative dilute concentrations, in either oil or water type spray bases. As in the case of the previous embodiment, the vapors thrown off by such an insecticide are not unpleasant to humans and animals for while the ether-cyanate-reaction product is characterized by a harsh odor, this may readily be counteracted by an odoriferous substance. A highly efficient spray may be made by incorporating about 5 to 7% of the concentrate above described in a suitable spray base of either the oil or water type and when applied about live stock or inanimate objects, is an effective repellent which remains active for a substantial period of time and is moreover toxic to insects which contact either surfaces to which the insecticide has been applied or the vapors arising therefrom.

In accordance with another embodiment of the present invention an excess of the chlorinated ether such, for instance, as dichlorethyl ether, may be employed over that necessary for reacting with the organic cyanate in accordance with the preceding embodiment. For example, 15 gallons of dichlorethyl ether may be reacted with 5 gallons of the desired organic cyanate, and thereafter a cyclohexylamine, such as N, N-amyl-benzoyl-cyclohexylamine, N, N-amyl-acetyl-cyclohexylamine, N, N-ethyl-benzoyl-cyclohexlamine, N, N-ethyl-acetyl-cyclohexylamine, may be added to the mixture and reacted with the excess dichlorethyl ether. This reaction may, in fact, be advantageously carried out in the presence of the essential oils hereinbefore mentioned. In the preparation of the insecticidal principle according to this embodiment the reacting procedure described hereinbefore with reference to dichlorethyl ether and organic cyanate may be followed until a temperature of 85°–100° C. is reached. At this point the cyclohexylamine, such for instance as N, N ethyl-benzoyl-cyclohexylamine, is added with concurrent agitation. While the temperature of the mixture is maintained around 85° C. for a period of about ten minutes agitation is continued in order to permit the reaction of the excess dichlorethyl ether with the cyclohexylamine to proceed. The resultant reaction product is of the character of an amino ether modified by various side chains and linkages. Thereafter, the other constituents of the insecticide may be incorporated as described in connection with the previous embodiment.

An insecticidal concentrate which is particularly suitable for use in the preparation of repellent fly sprays may be one compounded in accordance with the present invention and containing the raw materials in the following proportions:

| | | |
|---|---|---|
| Dichlorethyl ether | gals | 15 |
| An organic cyanate | do | 5 |
| A cyclohexylamine | lbs | 20 |
| Essential oils | gals | 15 |
| Orthophenyl phenol | lbs | 8 |
| Paradichlorobenzene | do | 20 |
| Naphthalene crystals | do | 80 |
| Citronella | gals | 2 |
| Spray base diluent | do | 150 |

An insecticidal concentrate constituted according to the present invention and particularly suitable for the manufacture of household insecticidal sprays may be one composed as follows, the percentages being on a weight basis:

| | Per cent |
|---|---|
| Dichlorethyl ether | 20 |
| An organic cyanate | 10 |
| A cyclohexylamine | 5 |
| Alpha or beta terpineol | 15 |
| Mineral oil diluent | 50 |

An agricultural spray may be compounded in accordance with the present invention with raw materials in approximately the following proportions:

| | | |
|---|---|---|
| Dichlorethyl ether | gals | 15 |
| An organic cyanate | do | 5 |
| A cyclohexylamine | lbs | 20 |
| Essential oils | gals | 15 |
| Pentachlorphenol | lbs | 25 |
| Paradichlorobenzene | do | 25 |
| Naphthalene crystals | do | 20 |
| Pine oil (or similar base) | As desired (for example 100 gals.) | |

With such an agricultural type spray a suitable spreading and wetting agent may be employed for facilitating the incorporation thereof in water. Such a spreading and wetting agent may be any one of a number of well known such agents capable of dispersing and emulsifying oils in water, but care must be exercised in the selection of such an emulsifying agent which will not exhibit any deleterious or unstabilizing action upon the ingredients of the concentrate.

In the foregoing illustrative embodiments where an essential oil is incorporated, the amount employed is at least one-third of the amount of ether-cyanate-reaction product, such proportions being in most instances desirable to produce vapors of sufficient body to attach themselves to the insects in such manner that the insect does not escape the toxic effect of the insecticide upon retreat from the atmosphere laden with vapors. The presence of such proportions of essential oils in the concentrates not only facilitates vaporization but facilitates penetration of the vapors into the bodies of the insects and consequently results in a more efficient insecticide.

From the foregoing description it should be apparent that the present invention accomplishes its objects and that an insecticidal principle is disclosed which possesses powerful repellent properties as well as high toxicity. While several illustrative embodiments of the invention have been described in detail, it is not to be understood that the invention is limited to those embodiments, but in fact that the novel insecticidal principle herein disclosed is applicable at large to use with a variety of known insecticides in any suitable vehicle. It is, therefore, to be distinctly understood that such modifications in the specific formulae and such applications of the features of the present invention as do not depart from the spirit of this invention are, although not specifically described herein, contemplated by and within the scope of the appended claims.

Having thus described the invention what is claimed is:

1. An insecticide comprising, the reaction product of dichlorethyl ether and an organic cyanate at temperatures in excess of 100° C.

2. An insecticide comprising, the reaction product of dichlorethyl ether and an organic cyanate at temperatures in excess of 100° C., and an odoriferous oil.

3. An insecticide comprising, the reaction product of dichlorethyl ether and an organic cyanate at temperatures in excess of 100° C., and a mineral oil.

4. An insecticide comprising, the reaction product of dichlorethyl ether and an organic cyanate at temperatures in excess of 100° C., an odoriferous oil, and a mineral oil.

5. An insecticide comprising, the reaction product of dichlorethyl ether and an organic cyanate, and an essential oil at a temperature in excess of 100° C., the essential oil being present in a volume at least one-third the volume of said reaction product.

6. An insecticide comprising, the endothermic reaction product of dichlorethyl ether and an organic cyanate, and a naphthalenic body having insect repellent properties.

7. An insecticide comprising, the endothermic reaction product of dichlorethyl ether and an organic cyanate, naphthalene and hydrogenated naphthalene.

8. An insecticide comprising, the endothermic reaction product of two volumes dichlorethyl ether and one volume an organic cyanate admixed with other ingredients in substantially the following proportions:

| | | |
|---|---|---|
| Reaction product | gals | 20–30 |
| Hydrogenated naphthalene | do | 5–10 |
| Naphthalene crystals | lbs | 25–100 |
| Essential oils | gals | 10–12 | odoriferous oil, and mineral oil.

9. In the art of making insecticides the process comprising, mixing dichlorethyl ether and an organic cyanate, and heating the mixture at a temperature in excess of 100° C.

10. In the art of making insecticides the process comprising, reacting dichlorethyl ether with an organic cyanate at a temperature in excess of 100° C. in the proportions of 1 to 2 parts by volume of the former to each part of the latter.

11. In the art of making insecticides, the process comprising, mixing dichlorethyl ether and an organic cyanate, heating the mixture at a temperature in excess of 100° C. and while the temperature is maintained, incorporating an essential oil.

12. In the art of making insecticides the process comprising, mixing dichlorethyl ether and an organic cyanate, heating the mixture at a temperature in excess of 100° C. and while the temperature is maintained, incorporating a naphthalenic body.

13. In the art of making insecticides the process comprising, mixing dichlorethyl ether and an organic cyanate, heating the mixture at a temperature in excess of 100° C. and while the temperature is maintained, incorporating a naphthalenic body and an essential oil.

14. In the art of making insecticides the process comprising mixing a dichlorethyl ether with an organic cyanate and an N,N-alkyl-acyl-cyclohexylamine and heating at a temperature in excess of 100° C.

15. An insecticide comprising the product prepared according to claim 14.

16. In the art of making insecticides the process comprising mixing a dichlorethyl ether with an N,N-alkyl-acyl-cyclohexylamine and heating at a temperature in excess of 100° C.

17. An insecticide comprising the product prepared according to claim 16.

HOMER E. WHITMIRE.